(12) United States Patent
Ishioka

(10) Patent No.: US 8,978,120 B2
(45) Date of Patent: Mar. 10, 2015

(54) COMMUNICATION CONTROL SYSTEM AND METHOD, AND COMMUNICATION DEVICE AND METHOD

(75) Inventor: Toshiyuki Ishioka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 171 days.

(21) Appl. No.: 13/810,252

(22) PCT Filed: Apr. 27, 2012

(86) PCT No.: PCT/JP2012/002920
§ 371 (c)(1),
(2), (4) Date: Jan. 15, 2013

(87) PCT Pub. No.: WO2012/157196
PCT Pub. Date: Nov. 22, 2012

(65) Prior Publication Data
US 2013/0117834 A1 May 9, 2013

(30) Foreign Application Priority Data
May 18, 2011 (JP) ................. 2011-111870

(51) Int. Cl.
*H04L 29/06* (2006.01)
*G06F 21/44* (2013.01)
(Continued)

(52) U.S. Cl.
CPC .............. *H04L 63/08* (2013.01); *G06F 21/445* (2013.01); *H04L 63/0869* (2013.01); *H04L 63/0876* (2013.01); *H04L 63/0884* (2013.01);
(Continued)

(58) Field of Classification Search
None
See application file for complete search history.

(56) References Cited

U.S. PATENT DOCUMENTS 8,224,354 B2 * 7/2012 De Vries et al. ........... 455/456.3
8,276,073 B2 9/2012 Okamoto et al.
(Continued)

FOREIGN PATENT DOCUMENTS

JP 2001-005967 1/2001
JP 2003-99404 4/2003
(Continued)

OTHER PUBLICATIONS

International Search Report issued Jun. 26, 2012 in International (PCT) Application No. PCT/JP2012/002920.

*Primary Examiner* — Shin-Hon Chen
(74) *Attorney, Agent, or Firm* — Wenderoth, Lind & Ponack, L.L.P.

(57) ABSTRACT

A communication control system pairs a first communication device with a second communication device, the first communication device includes a first image editing unit that edits an input image in accordance with a predetermined rule to generate a first authentication image, and a first transmission unit that transmits first authentication data representing the first authentication image and a first identifier for identifying the first communication device to a server device, the second communication device includes a second transmission unit that transmits second authentication data representing the second authentication image and a second identifier for identifying the second communication device to the server device, and the server device includes a pairing unit that pairs the first communication device with the second communication device in the case where it is determined that the first authentication data matches the second authentication data.

15 Claims, 10 Drawing Sheets

(51) Int. Cl.

| | | |
|---|---|---|
| *H04W 12/06* | (2009.01) | |
| *G06F 7/04* | (2006.01) | |
| *G06F 15/16* | (2006.01) | |
| *G06F 17/30* | (2006.01) | |
| *H04W 12/08* | (2009.01) | |

(52) U.S. Cl.
CPC ............... *H04L63/10* (2013.01); *H04W 12/06* (2013.01); *H04W 12/08* (2013.01); *G06F 2221/2129* (2013.01)
USPC .................. 726/7; 713/171; 713/183; 726/5; 726/9

(56) References Cited

U.S. PATENT DOCUMENTS

| | | | |
|---|---|---|---|
| 8,316,237 | B1* | 11/2012 | Felsher et al. ................ 713/171 |
| 8,495,372 | B2* | 7/2013 | Bailey et al. ................. 713/171 |
| 2005/0224573 | A1* | 10/2005 | Yoshizane et al. ............ 235/379 |
| 2006/0159312 | A1* | 7/2006 | Chiang et al. ................ 382/115 |
| 2006/0286969 | A1* | 12/2006 | Talmor et al. ................. 455/415 |
| 2008/0289023 | A1* | 11/2008 | Wardrop ........................... 726/9 |
| 2009/0176505 | A1* | 7/2009 | Van Deventer et al. .... 455/456.1 |
| 2009/0228707 | A1* | 9/2009 | Linsky .......................... 713/171 |
| 2009/0249077 | A1* | 10/2009 | Gargaro et al. ............... 713/183 |
| 2010/0030868 | A1 | 2/2010 | Okamoto et al. |
| 2010/0058192 | A1 | 3/2010 | Okamoto et al. |
| 2010/0107208 | A1 | 4/2010 | Okamoto et al. |
| 2010/0154020 | A1 | 6/2010 | Okamoto et al. |
| 2010/0210287 | A1 | 8/2010 | De Vries et al. |
| 2010/0313231 | A1 | 12/2010 | Okamoto et al. |
| 2011/0023097 | A1* | 1/2011 | McDiarmid et al. .............. 726/5 |
| 2011/0244829 | A1 | 10/2011 | Kase |
| 2011/0314153 | A1* | 12/2011 | Bathiche et al. .............. 709/225 |
| 2012/0167190 | A1* | 6/2012 | Tie et al. ........................... 726/7 |

FOREIGN PATENT DOCUMENTS

| | | |
|---|---|---|
| JP | 2004-157675 | 6/2004 |
| JP | 2005-149326 | 6/2005 |
| JP | 2007-328807 | 12/2007 |
| JP | 2008-085747 | 4/2008 |
| JP | 2009-69932 | 4/2009 |
| JP | 4327441 | 9/2009 |
| JP | 2010-055522 | 3/2010 |
| JP | 2010-534443 | 11/2010 |
| JP | 2011-227882 | 11/2011 |
| WO | 2008/093781 | 8/2008 |
| WO | 2009/014438 | 1/2009 |
| WO | 2009/111763 | 9/2009 |

\* cited by examiner

COMMUNICATION CONTROL SYSTEM AND METHOD, AND COMMUNICATION DEVICE AND METHOD

TECHNICAL FIELD

The present invention relates to a communication control system that pairs a first communication device with a second communication device to control communication between the first communication device and the second communication device.

BACKGROUND OF INVENTION

Background Art

In recent years, with the spread of digital still cameras and digital video cameras, photographs and videos have been electronized, and more users have published contents such as photographs stored in personal computers, video recorders and the like to relatives and friends over the Internet.

Under such circumstances, a public ID can be used to prevent persons other than particular partners who share contents photographs and so on from viewing the contents (Refer to PTL 1, for example). It is assumed that a user A gives his/her public ID to his/her parents B living apart from the user A. The parents B can view photographs stored by the user A by inputting the public ID given from the user A into their equipment.

In user authentication in personal computers and the like, a password as an n-digit numeric character or alphanumeric character string has been frequently used and however, the dry alphanumeric character string is disadvantageously easy to forget. Thus, a relatively memorable photograph or the like can be used in place of the password of alphanumeric character string (Refer to PTL 2, for example).

CITATION LIST

Patent Literature

[PTL 1] International Publication No. 2008/093781
[PTL 2] Japanese Patent No. 4327441

SUMMARY OF INVENTION

However, the above-mentioned conventional art requires further improvement in security.

Thus, an object of the present invention is to provide a communication control system, a communication control method, a communication device, and a communication method that can improve the security in pairing a first communication device with a second communication device.

To attain the above-mentioned object, a communication control system according to an aspect of the present invention includes: a first communication device; a second communication device; and a server device that pairs the first communication device with the second communication device to control communication between the first communication device and the second communication device, wherein the first communication device includes: a first image input unit configured to receive an input of an input image; a first image editing unit configured to edit the input image in accordance with a predetermined rule to generate a first authentication image; and a first transmission unit configured to transmit first authentication data representing the first authentication image and a first identifier for identifying the first communication device to the server device, the second communication device includes: a second transmission unit configured to transmit second authentication data representing a second authentication image and a second identifier for identifying the second communication device to the server device, and the server device includes a server receiving unit configured to receive the first authentication data and the first identifier from the first communication device, and receive the second authentication data and the second identifier from the second communication device; a comparison unit configured to determine whether or not the first authentication data matches the second authentication data; a pairing unit configured to pair the first communication device with the second communication device, using the first identifier and the second identifier, in the case where it is determined that the authentication data matches the second authentication data.

These general or specific modes may be implemented by a system, a device, a method, an integrated circuit, a computer program, or a recording medium, or may be implemented by any combination of the system, the device, the method, the integrated circuit, the computer program, and the recording medium.

According to the present invention, it is possible to improve the security in pairing the first communication device with the second communication device.

Figure 1:
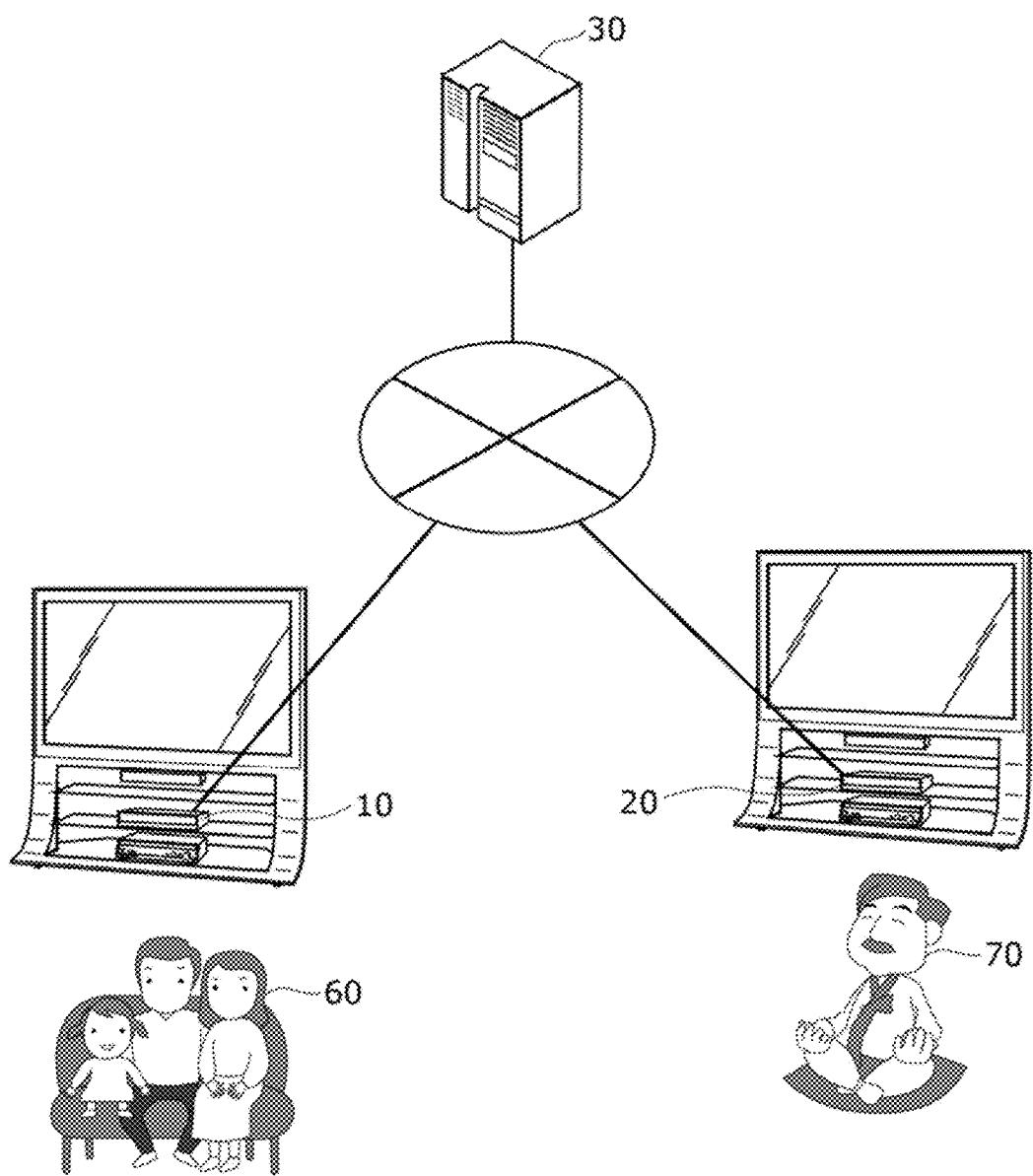
FIG. 1 is a view showing an appearance of an example of a communication control system in accordance with First embodiment of the present invention.

DETAILED DESCRIPTION OF INVENTION (Course Leading to One Aspect of the Present Invention)

An n-digit numeric character or alphanumeric character string is generally used as the public ID described in PTL 1. However, in the case where the alphanumeric character string is the public ID, when a publishing person delivers the public ID to a partner who shares some types of contents, a public ID transcription or transmission error easily occurs. Further, when the partner inputs the public ID, inputting is troublesome and an input error is easy to occur. Moreover, when the publishing person passes a note or sends an e-mail to the partner, the note or the e-mail may be passed to any undesired person by mistake. In such case, the undesired person is likely to find that the public ID written in the note or the e-mail is some kind of password.

As described in PTL 2, a photograph can be used as the public ID. However, since any person other than the partner may have the photograph, the photograph is not suitable for the public ID.

A communication control system according to one aspect of the present invention includes: a first communication device; a second communication device; and a server device that pairs the first communication device with the second communication device to control communication between the first communication device and the second communication device, wherein the first communication device includes: a first image input unit configured to receive an input of an input image; a first image editing unit configured to edit the input image in accordance with a predetermined rule to generate a first authentication image; and a first transmission unit configured to transmit first authentication data representing the first authentication image and a first identifier for identifying the first communication device to the server device, the second communication device includes: a second transmission unit configured to transmit second authentication data representing a second authentication image and a second identifier for identifying the second communication device to the server device, and the server device includes: a server receiving unit configured to receive the first authentication data and the first identifier from the first communication device, and receive the second authentication data and the second identifier from the second communication device; a comparison unit configured to determine whether or not the first authentication data matches the second authentication data; a pairing unit configured to pair the first communication device with the second communication device, using the first identifier and the second identifier, in the case where it is determined that the first authentication data matches the second authentication data.

With this configuration, the first communication device is paired with the second communication device by using the image edited by the first communication device as the authentication image. Since the edited image is used, the possibility that the authentication image matches authentication images of other communication device can be reduced, preventing wrong pairing with the other communication devices. Even when the authentication data representing the authentication image is leaked to any undesired person, there is a low probability that the possibility that the undesired person finds that the authentication data is pairing data. That is, with this configuration, the security in pairing the first communication device with the second communication device can be improved.

Further, the first image editing unit may include an image clipping unit configured to clip a partial area of the input image in accordance with the predetermined rule to edit the input image.

With this configuration, by clipping the partial area of the input image, the authentication image can be easily generated.

Further, the first image clipping unit may be configured to extract an object from the input image and clip an area including the extracted object as the partial area in accordance with the predetermined rule.

With this configuration, by clipping the area including the object from the input image, the authentication image is generated. Accordingly, since the authentication image can remind the user of the second communication device of the user of the first communication device, it can be prevented that authentication data of the other users is wrongly transmitted from the second communication device to the server device.

Further, the first image editing unit may include a first image processing unit configured to change a pixel value of at least one of pixels included in the input image in accordance with the predetermined rule to edit the input image.

With this configuration, by changing the pixel value of the input image, the authentication image can be easily generated.

Further, the first communication device may further include a first data string conversion unit configured to convert the first authentication image into a data string by using a one-way function to generate the first authentication data.

With this configuration, the first authentication data is generated by converting the first authentication image into the data string by using a one-way function. Accordingly, in the server device, it is difficult to reconstitute the first authentication image from the first authentication data, which protect the user's privacy.

Further, the second communication device may further include a second data string conversion unit configured to convert the second authentication image into a data string by using the one-way function to generate the second authentication data.

With this configuration, also in the second communication device, the authentication data that is hardly reconstituted into an image can be generated.

Further, the second communication device may further include: a second image input unit configured to receive an input of the input image; and a second image editing unit configured to edit the input image in accordance with the predetermined rule to generate the second authentication image.

With this configuration, also in the second communication device as in the first communication device, the authentication image can be generated by editing the input image. Accordingly, even when the input image is inputted to the second communication device, pairing can be performed. That is, even when data is leaked during data transfer between the user first communication device and the user of the second communication device, pairing cannot be performed by using the data as it is, which can improve the security.

Further, the communication control system may further include a first portable terminal; and a second portable terminal connected to the first portable terminal via a wide-area communication network, the first communication device further includes a first image output unit configured to output the input image to the first portable terminal, the first portable terminal transmits, to the second portable terminal, the input image outputted from the first image output unit, the second portable terminal may receive the input image from the first portable terminal, and the second image input unit may be further configured to receive an input of the input image from the second portable terminal.

With this configuration, the input image can be easily transferred from the first communication device to the second communication device by using the portable terminal.

Further, the server device may further include a server transmission unit configured to transmit the second identifier to the first communication device, and transmit the first identifier to the second communication device, in the case where the first communication device is paired with the second communication device, the first communication device further includes: a first receiving unit configured to receive the second identifier from the server device; and a first address book registration unit configured to register the received second identifier in an address book, and the second communication device further includes: a second receiving unit configured to receive the first identifier from the server device; and a second address book registration unit configured to register, in the address book, the received first identifier and the second authentication image in association with each other.

With this configuration, the second communication device can register the second authentication image used for pairing with the first communication device in the address book. Accordingly, as long as the second authentication image can remind the user of the second communication device of the user of the first communication device, the user of the second communication device does not need to input the user name of the first communication device or the like to the address book. That is, with this configuration, the convenience of the user of the second communication device can be improved.

Further, the second transmission unit may be further configured to transmit the second authentication image as a registration image to the server device, the server receiving unit may be further configured to receive the registration image from the second communication device, the server transmission unit is further configured to transmit the registration image to the first communication device, the first receiving unit is further configured to receive the registration image from the server device, and the first address book registration unit may be configured to register, in the address book, the second identifier and the registration image in association with each other.

With this configuration, the first communication device can register the registration image in the address book. Accordingly, as long as the registration image can remind the user of the first communication device of the user of the second communication device, the user of the first communication device does not need to input the user name of the second communication device or the like to the address book. That is, with this configuration, the convenience of the user of the first communication device can be improved.

Further, the first communication device may further include an image check unit configured to present the registration image to a user and receive an input of a check result about the registration image from the user, the first transmission unit may be further configured to transmit the check result received by the image check unit to the server device, the server receiving unit may be further configured to receive the check result from the first communication device, and the pairing unit may be configured to pair the first communication device with the second communication device according to the check result in the case where it is determined that the first authentication data matches the second authentication data.

With this configuration, the user of the first communication device checks whether or not the pairing partner is the user of the second communication device on the basis of the registration image. Therefore, it can be prevented that the first communication device is paired with a communication device of a user who is not the correct pairing partner.

Further, the server device may further include: an authentication image storage unit configured to store registered authentication data that is authentication data used in previous pairing; and an matching check unit configured to check whether or not the first authentication data matches the registered authentication data stored in the authentication image storage unit, and the pairing unit is configured to pair the first communication device with the second communication device in the case where it is determined that the first authentication data matches the second authentication data and where the first authentication data does not match the registered authentication data.

With this configuration, it is checked whether or not the first authentication data matches the registered authentication data. Therefore, it can be prevented that the first communication device is wrongly paired with communication devices of undesired users, which can improve the security.

Further, the first image input unit may be further configured to receive an image taken by a portable terminal as the input image from the portable terminal.

With this configuration, the image taken by the portable terminal can be acquired as the input image.

Further, the first image input unit may be an interface for a portable recording medium.

With this configuration, the image recorded in the portable recording medium can be acquired as the input image.

Further, the first image input unit may be an interface for near field communication.

With this configuration, the input image can be acquired by near field communication.

Further, a communication device according to one aspect of the present invention is a communication device paired with another communication device, including: an first image input unit configured to receive an input of an input image; a first image editing unit configured to edit the input image in accordance with a predetermined rule to generate a first authentication image; and a first transmission unit configured to transmit first authentication data representing the first authentication image and a first identifier for identifying the first communication device to a server device that performs the pairing.

With this configuration, the same effects as those in the communication control system can be obtained.

These general or specific modes may be implemented by a system, a device, a method, an integrated circuit, a computer program, or a recording medium, or may be implemented by any combination of the system, the device, the method, the integrated circuit, the computer program, or the recording medium.

Embodiments of the present invention will be described with reference to figures.

Each of the below-mentioned embodiments shows one specific example. The number, shape, material, components, arrangement and connection of the components, steps, and the order of steps in the following embodiments are merely examples, and do not intend to limit the present invention. Further, among components in the following embodiments, components that are not recited in independent claims indicating the highest concept are described as optional components.

First Embodiment

FIG. 1 is a view showing an appearance of an example of a communication control system in accordance with First embodiment of the present invention. As shown in FIG. 1, the communication control system includes a first communication device 10, a second communication device 20, and a server device 30.

The first communication device 10 is connected to a network, and communicates with devices on the network. Examples of the first communication device 10 include an HDD (Hard Disk Drive) recorder, a home server, and a television. In this embodiment, the first communication device 10 is used by a first user 60 as a user who supplies content data.

The second communication device 20 is connected to a network, and communicates with devices on the network. Examples of the second communication device 20 include an HDD recorder, a home server, and a television. In this embodiment, the second communication device 20 is used by a second user 70 as a user who receives the content data.

To control communication between the first communication device 10 and the second communication device 20, the server device 30 pairs the first communication device 10 with the second communication device 20. That is, in this embodiment, the server device 30 pairs the first communication device 10 with the second communication device 20, thereby supplying the content data from the first communication device 10 to the second communication device 20.

Next, a functional structure of each device included in the communication control system will be described.

Figure 2:
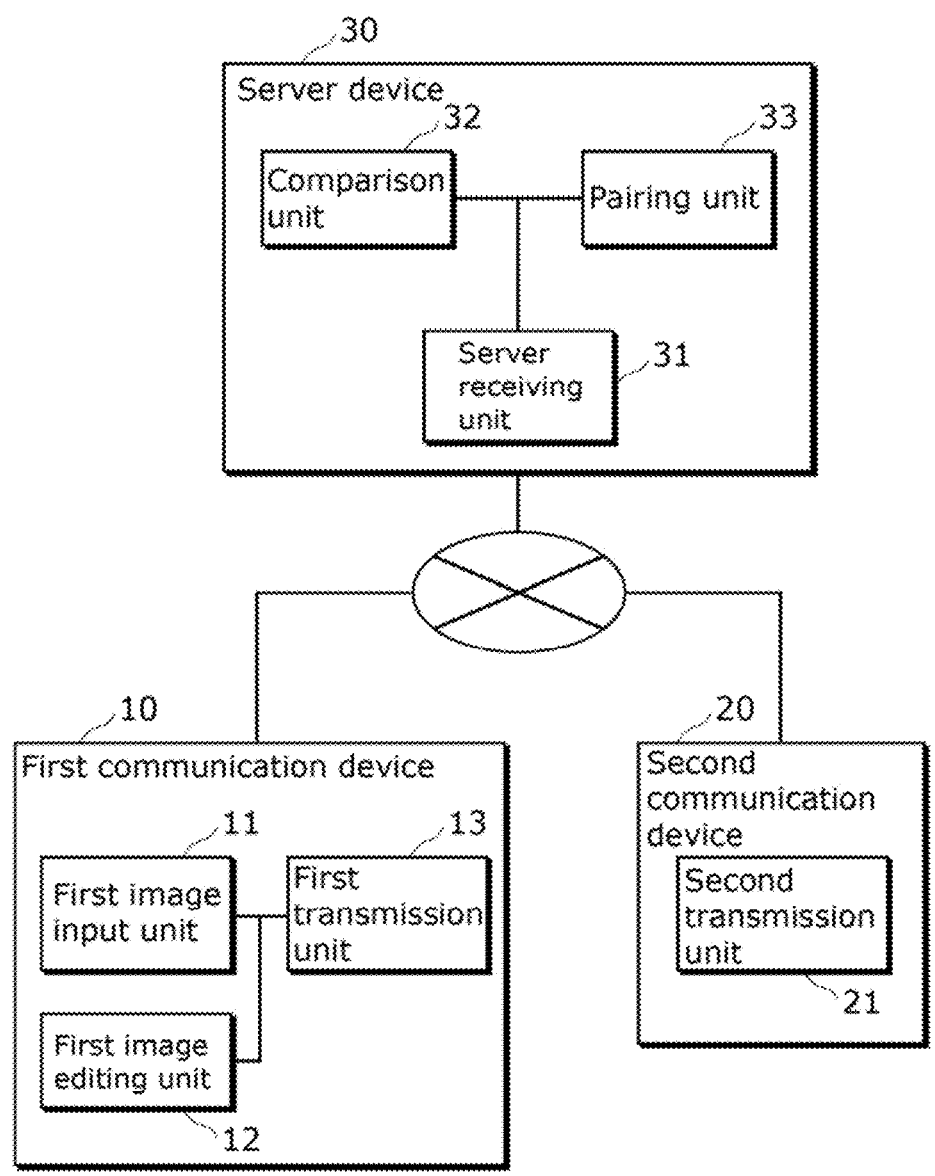
FIG. 2 is a block diagram showing a functional structure of the communication control system in accordance with First embodiment of the present invention.

FIG. 2 is a black diagram showing a functional structure of the communication control system in accordance with First embodiment of the present invention.

First, the first communication device 10 will be described. As shown in FIG. 2, the first communication device 10 includes a first image input unit 11, a first image editing unit 12, and a first transmission unit 13.

The first image input unit 11 receives an input of an input image. Specifically, the first image input unit 11 is, for example, an interface for a portable recording medium (ex. flash memory or SD card). That is, the first image input unit 11 acquires an input image recorded in the portable recording medium.

For example, the first image input unit 11 may receive an image taken by a portable terminal (for example, mobile phone having a camera function) as the input image from the portable terminal. In this case, the first image input unit 11 may be an interface for near field communication (NFC). That is, the first image input unit 11 acquires the input image from the portable terminal by near field communication.

The first image input unit 11 is not limited to the above-mentioned interfaces, and may be an interface for wireless LAN (Local Area Network), Bluetooth (registered trademark), or infrared communication.

The first image editing unit 12 edits the input image in accordance with a predetermined rule to generate a first authentication image. The predetermined rule defines a method of editing the input image. The first transmission unit 13 transmits first authentication data and a first identifier to the server device 30. In this embodiment, the first transmission unit 13 transmits a first pairing request including the first authentication data and the first identifier to the server device 30 via the network.

The first authentication data is data representing the first authentication image. In this embodiment, the first authentication data is image data. It is noted that the first authentication data is not necessarily image data representing the first authentication image itself, and may be data including a value representing the first authentication image.

The first identifier is an identifier for identifying the first communication device 10. Specifically, the first identifier is, for example, a device ID for uniquely identifying a device. The first identifier may be a logical address (for example, IP address) assigned to identify a device on the network. Alternatively, the first identifier may be a physical address (for example, MAC address) uniquely assigned to a device to identify each node on the network.

Next, the second communication device 20 will be described. As shown in FIG. 2, the second communication device 20 includes a second transmission unit 21.

The second transmission unit 21 transmits second authentication data and a second identifier to the server device 30. In this embodiment, the second transmission unit 21 transmits a second pairing request including the second authentication data and the second identifier to the server device 30 via the network.

The second authentication data is data representing second authentication image. In this embodiment, the second authentication data is image data. It is noted that the second authentication data, like the first authentication data, is not necessarily image data representing the second authentication image itself, and may be data including a value representing the second authentication image.

It is supposed that the second authentication image is the same as the first authentication image. For example, the second communication device 20 acquires the second authentication image as follows. First, the second user 70 acquires the first authentication image from the first user 60 by means of an e-mail or the like. Then, the second communication device 20 receives an input of the first authentication image from the second user 70. The first authentication image thus received is handled as the second authentication image.

The second identifier is similar to the first identifier, and is an identifier for identifying the second communication device 20.

Next, the server device 30 will be described. As shown in FIG. 2, the server device 30 includes a server receiving unit 31, a comparison unit 32, and a pairing unit 33.

The server receiving unit 31 receives the first authentication data and the first identifier from the first communication device 10. That is, in this embodiment, the server receiving unit 31 receives the first pairing request from the first communication device 10.

The server receiving unit 31 receives the second authentication data and the second identifier from the second communication device 20. That is, in this embodiment, the server receiving unit 31 receives the second pairing request from the second communication device 20.

The comparison unit 32 determines whether or not the received first authentication data matches the received second authentication data. That is, the comparison unit 32 compares the first authentication data with the second authentication data.

In the case where it is determined that the first authentication data matches the second authentication data, the pairing unit 33 pairs the first communication device 10 with the second communication device 20, using the first identifier and the second identifier.

That the first communication device 10 is paired with the second communication device 20 means that it is controlled such that content data can be supplied from the first communication device 10 to the second communication device 20. For example, in the case where the first communication device 10 is paired with the second communication device 20, at a download request from the second communication device 20, the server device 30 transmits the content data of the first communication device 10, which is stored in the server device 30, to the second communication device 20. Conversely, in the case where the first communication device 10 is not paired with the second communication device 20, even when the download request from the second communication device 20 is made, the server device 30 does not transmit the content data of the first communication device 10 to the second communication device 20.

It is noted that the content data of the first communication device 10 is not necessarily stored in the server device 30. For example, in the case where the first communication device 10 is paired with the second communication device 20, the server device 30 may control communication between the first communication device 10 and the second communication device 20 such that the first communication device 10 and the second communication device 20 can communicate with each other according to peer-to-peer (P2P) protocols.

Next, various operations of the communication control system thus constituted will be described below with reference to figures.

Figure 3:
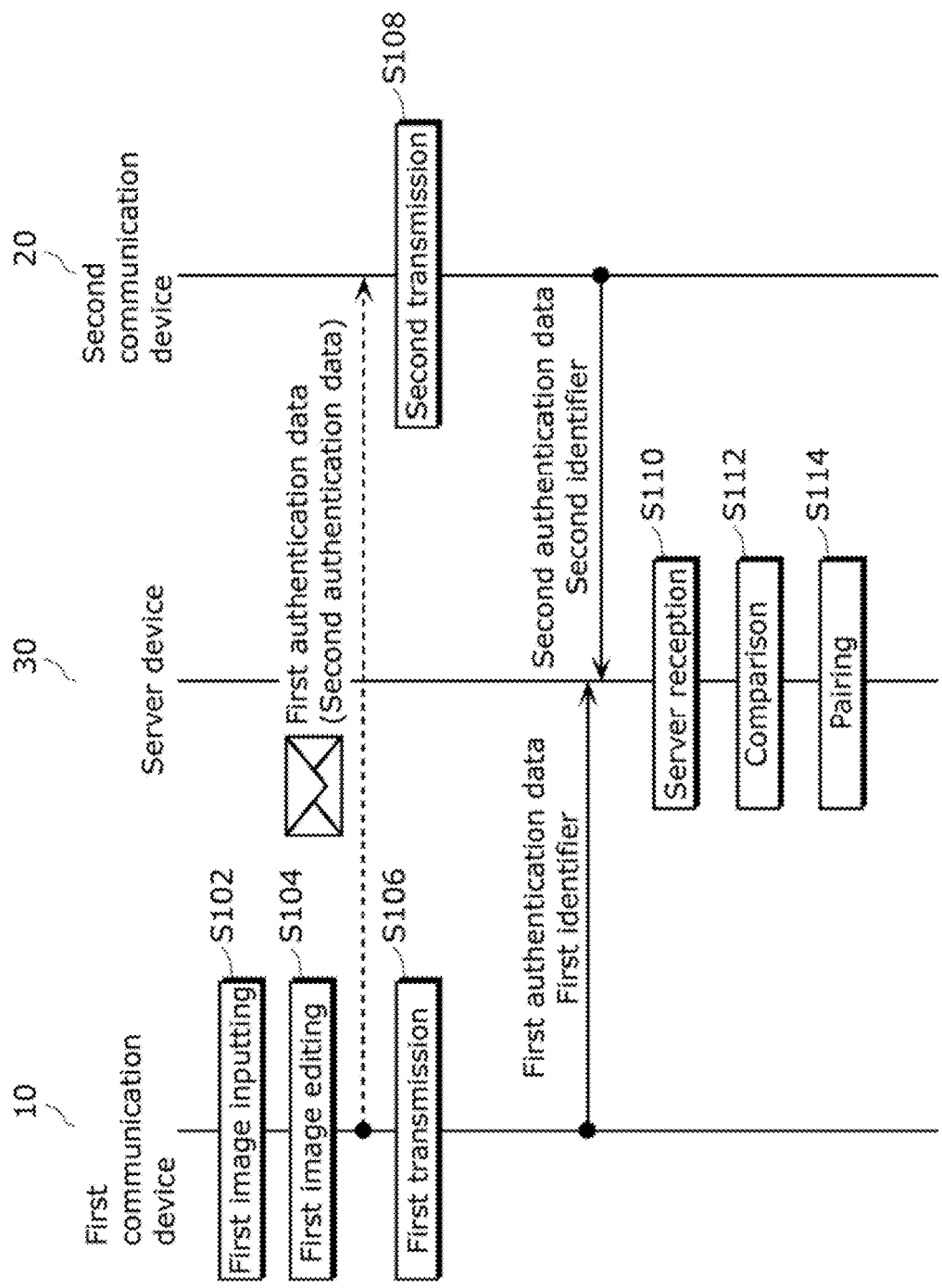
FIG. 3 is a view showing processing operations of the communication control system in accordance with First embodiment of the present invention.

FIG. 3 is a view showing processing operations of the communication control system in accordance with First embodiment of the present invention.

First, the first image input unit 11 of the first communication device 10 receives an input of the input image (S102). Subsequently, the first image editing unit 12 edits the input image in accordance with a predetermined rule to generate the first authentication image (S104). Then, the first transmission unit 13 transmits the first pairing request to the server device 30 (S106). That is, the first transmission unit 13 transmits the first authentication data and the first identifier to the server device 30.

Here, the first user 60 as a user of the first communication device 10 transmits the first authentication image to the second user 70 as a user of the second communication device 20 by means of an e-mail or similar means. The second user 70 inputs the received first authentication image as the second authentication image to the second communication device 20.

The second transmission unit 21 of the second communication device 20 transmits the second pairing request to the server device 30 (S108). That is, the second transmission unit 21 transmits the second authentication data representing the second authentication image and the second identifier to the server device 30.

The server receiving unit 31 of the server device 30 receives the first pairing request from the first communication device 10, and the second pairing request from the second communication device 20 (S110). That is, the server receiving unit 31 receives the first authentication data and the first identifier from the first communication device 10, and the second authentication data and the second identifier from the second communication device 20.

The first pairing request and the second pairing request are not necessarily received at the same time, and either of the requests may be received in advance.

Next, the comparison unit 32 determines whether or not the first authentication data matches the second authentication data (S112). When it is determined that the first authentication data matches the second authentication data, the pairing unit 33 pairs the first communication device 10 with the second communication device 20, using the first identifier and the second identifier (S114). When it is determined that the first authentication data does not match the second authentication data, the pairing unit 33 does not pair the first communication device 10 with the second communication device 20.

As described above, the communication control system in accordance with this embodiment uses the image edited by the first communication device 10 as the authentication image, thereby pairing the first communication device 10 with the second communication device 20. Since the edited image is used, the probability that the authentication data matches authentication images of other undesired communication devices can be lowered to prevent the concerned communication device from being paired with the undesired communication devices by mistake. Further, even when the authentication data representing the authentication image is leaked to any undesired person, the probability that the undesired person recognize the authentication data as data for pairing is low. That is, the communication control system in this embodiment can improve the security in pairing the first communication device 10 with the second communication device 20.

Second Embodiment

Next, Second embodiment of the present invention will be described with reference to figures.

Figure 4:
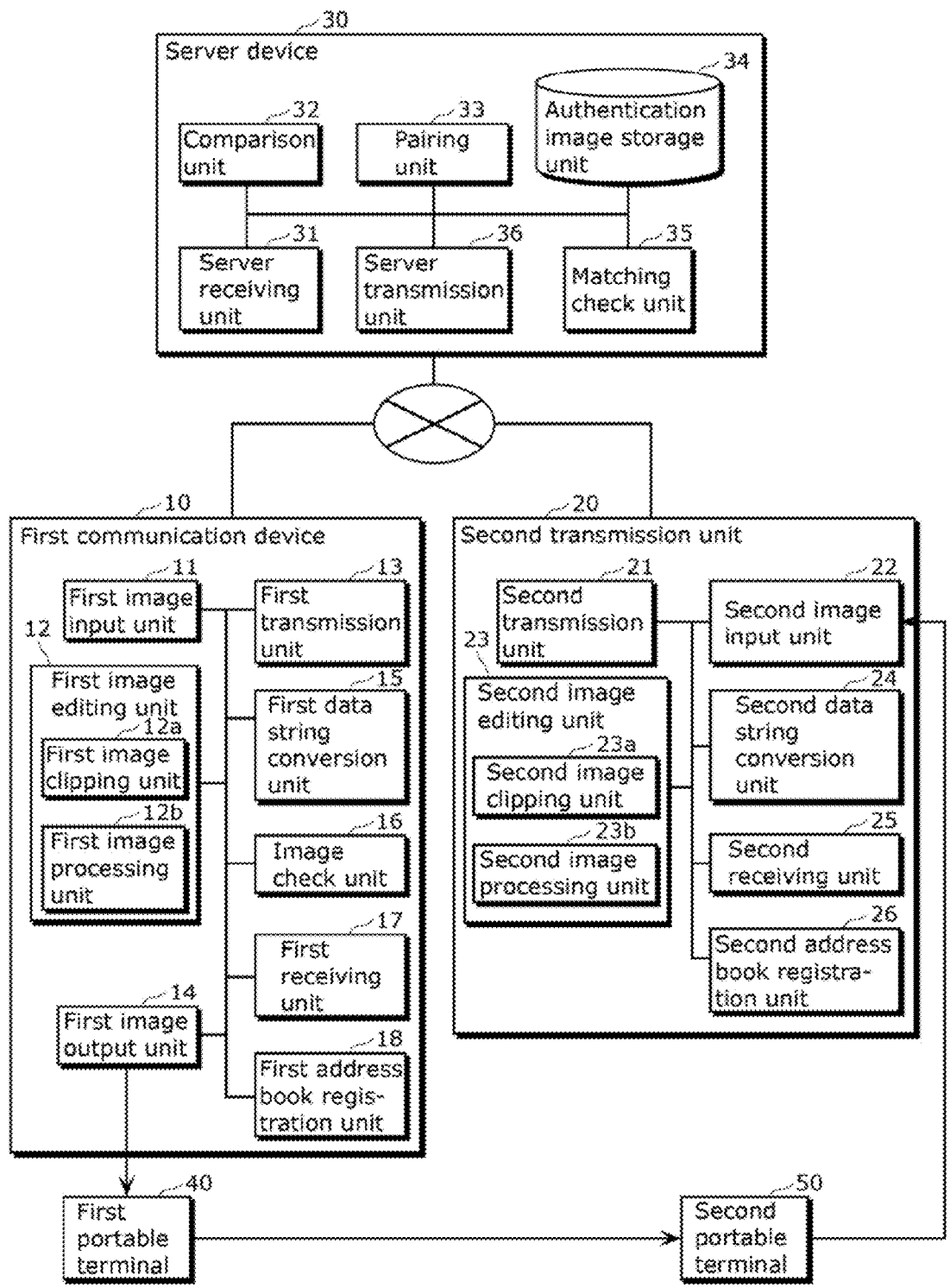
FIG. 4 is a block diagram showing a functional structure of a communication control system in accordance with Second embodiment of the present invention.

FIG. 4 is a block diagram showing a functional structure of a communication control system in accordance with Second embodiment of the present invention. The communication control system in accordance with this embodiment includes a first communication device 10, a second communication device 20, a server device 30, a first portable terminal 40, and a second portable terminal 50.

First, the first communication device 10 will be described. As shown in FIG. 4, the first communication device 10 includes a first image input unit 11, a first image editing unit 12, a first transmission unit 13, a first image output unit 14, a first data string conversion unit 15, an image check unit 16, a first receiving unit 17, and a first address book registration unit 18.

As in First embodiment, the first image input unit 11 receives an input of an input image.

The first image editing unit 12 edits the input image in accordance with a predetermined rule to generate the first authentication image. The first image editing unit 12 includes a first image clipping unit 12a and a first image processing unit 12b.

The first image clipping unit 12a clips a partial area of the input image, thereby editing the input image. The partial area is determined in accordance with a predetermined rule.

For example, the first image clipping unit 12a may determine an area to be clipped depending on the input image. Specifically, the first image dipping unit 12a may extract an object (for example, human's face) from the input image, and clip an area including the extracted object. Thereby, since the authentication image can remind the second user 70 of the first user 60, it can be prevented that authentication data of other undesired users is transmitted from the second communication device 20 to the server device 30 by mistake.

For example, the first image clipping unit 12a may clip an area of predetermined size, which is located at the center of the input image.

The first image processing unit 12b changes a pixel value of at least one of pixels included in the input image in accordance with a predetermined rule to edit the input image. Here, the first image processing unit 12b processes the image clipped from the input image by the first image clipping unit 12a to generate the first authentication image.

Specifically, for example, the first image processing unit 12b changes a pixel value of an edge of an image clipped from the input image to a predetermined value. Alternatively, the first image processing unit 12b may embed predetermined information into an image clipped from the input image by electronic watermarking.

As in First embodiment, the first transmission unit 13 transmits the first authentication data and the first identifier to the server device 30. Further, the first transmission unit 13 transmits a check result received by the below-mentioned image check unit 16 from the first user 60 to the server device 30.

The first image output unit 14 outputs the input image to the first portable terminal 40. Specifically, the first image output unit 14 outputs the input image to the first portable terminal 40, for example, by near field communication or infrared communication, or via a portable recording medium.

The first data string conversion unit 15 converts the first authentication image into a data string by using a one-way function, thereby generating the first authentication data. The one-way function is a function whose inverse function is extremely difficult to calculate, such as a hash function. That is, it is difficult to reconstitute the first authentication image from the first authentication data thus generated.

The image check unit 16 presents a registration image to the first user 60, and receives an input of a check result about the registration image from the first user 60. That is, the image check unit 16 receives the check result about whether or not the registration image is an image of a second user from the first user 60. That is, the first user 60 checks whether or not the user identified from the registration image is a correct partner to which the content data is supplied.

The first receiving unit 17 receives the registration image from the server device 30. The first receiving unit 17 also receives the second identifier from the server device 30.

The first address book registration unit 18 registers the received second identifier in an address book. Specifically, the first address book registration unit 18 registers, in the address book, the second identifier and the registration image in association with each other.

The address book is used when the content data is supplied to the second communication device 20 after pairing of the first communication device 10 with the second communication device 20. For example, in the case where the second user 70 is a person to which the content data is to be supplied, the address book is used as follows.

First, when deciding a partner to which the content data is supplied, the first communication device 10 presents a plurality of images registered in the address book to the first user 60. The first communication device 10 receives an input to select an image of the second user 70 among the plurality of presented images from the first user 60. The first communication device 10 transmits the second identifier corresponding to the image of the second user 70 thus selected together with the content data to the server device 30. As a result, the server device 30 manages the received content data such that the content data can be supplied to the second communication device 20 identified based on the second identifier.

Next, the second communication device 20 will be described. As shown in FIG. 4, the second communication device 20 includes a second transmission unit 21, a second image input unit 22, a second image editing unit 23, a second data string conversion unit 24, a second receiving unit 25, and a second address book registration unit 26.

As in First embodiment, the second transmission unit 21 transmits the second authentication data and the second identifier to the server device 30. The second transmission unit 21 transmits the second authentication image as the registration image to the server device 30. It is preferred that the registration image enables the first user 60 to recognize the registration image as the image of the second user 70.

The second image input unit 22 receives an input of the input image. In this embodiment, the second image input unit 22 receives the input of the input image from the second portable terminal 50.

The second image editing unit 23 edits the input image in accordance with a predetermined rule to generate the second authentication image. The predetermined rule is the same as the rule used when the first image editing unit 12 of the first communication device 10 edits the input image. Accordingly, the second authentication image is the same as the first authentication image.

The second image editing unit 23 includes a second image clipping unit 23a and a second image processing unit 23b. The second image clipping unit 23a is the same as the first image clipping unit 12a and thus, description thereof is omitted. The second image processing unit 23b is the same as the first image processing unit 12b and thus, description thereof is omitted.

The second data string conversion unit 24 converts the second authentication image into a data string by using the one-way function, thereby generating the second authentication data. The one-way function is the same function as the one-way function used by the first data string conversion unit 15 of the first communication device 10. Accordingly, the second authentication data is the same as the first authentication data.

The second receiving unit 25 receives the first identifier from the server device 30.

The second address book registration unit 26 registers, in the address book, the received first identifier and the second authentication image in association with each other. The address book is used when the content data is supplied from the first communication device 10 after pairing of the first communication device 10 with the second communication device 20. That is, referring to the second authentication image, the second user 70 can identify the first user 60 as the user of the first communication device 10.

Next, the server device 30 will be described. As shown in FIG. 4, the server device 30 includes a server receiving unit 31, a comparison unit 32, a pairing unit 33, an authentication image storage unit 34, an matching check unit 35, and a server transmission unit 36.

As in First embodiment, the server receiving unit 31 receives the first authentication data and the first identifier from the first communication device 10, and the second authentication data and the second identifier from the second communication device 20. The server receiving unit 31 also receives the registration image from the second communication device 20, and the check result about the registration image from the first communication device 10.

As in First embodiment, the comparison unit 32 determines whether or not the first authentication data matches the second authentication data.

In the case where it is determined that the first authentication data matches the second authentication data, and where the first authentication data does not match registered authentication data, the pairing unit 33 pairs the first communication device 10 with the second communication device 20, using the first identifier and the second identifier according to the check result about the registration image.

Authentication data used in past pairing is stored as the registered authentication data in the authentication image storage unit 34.

The matching check unit 35 checks whether or not the first authentication data matches the registered authentication data stored in the authentication image storage unit 34.

The server transmission unit 36 transmits the registration image received from the second communication device 20 to the first communication device 10. When the first communication device 10 is paired with the second communication device 20, the server transmission unit 36 transmits the second identifier to the first communication device 10, and the first identifier to the second communication device 20.

Next, the first portable terminal 40 and the second portable terminal 50 will be described.

The first portable terminal 40 transmits the input image outputted from the first image output unit 14 of the first communication device 10 to the second portable terminal 50 connected thereto via a wide-area communication network.

The second portable terminal 50 receives the input image from the first portable terminal 40, and outputs the input image to the second communication device 20.

Next, various operations of the communication control system thus configured will be described with reference to a figure.

Figure 5:
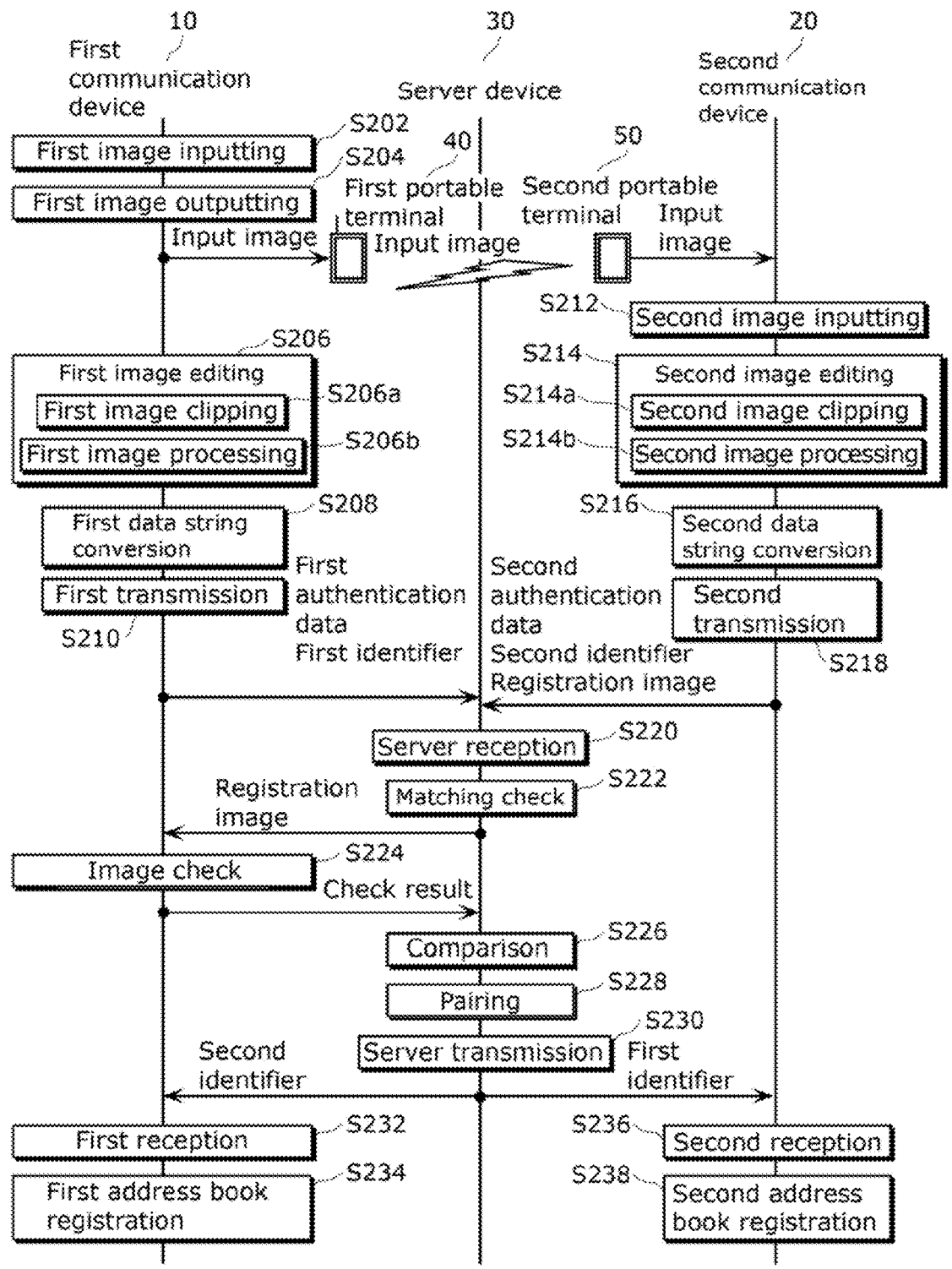
FIG. 5 is a view showing processing operations of the communication control system in accordance with Second embodiment of the present invention.

FIG. 5 is a view showing processing operations of the communication control system in accordance with Second embodiment of the present invention.

First, the first image input unit 11 of the first communication device 10 receives an input of the input image (S202). Subsequently, the first image output unit 14 outputs the input image to the first portable terminal 40 (S204). The first portable terminal 40 transmits the input image to the second portable terminal 50 connected thereto via the wide-area communication network.

Subsequently, the first image editing unit 12 of the first communication device 10 edits the input image in accordance with a predetermined rule to generate the first authentication image (S206). Specifically, first, the first image clipping unit 12a clips a partial area of the input image (S206a). Subsequently, the first image processing unit 12b changes a pixel value of at least one of pixels included in the partial area clipped in accordance with a predetermined rule to generate the first authentication mage (S206b).

Next, the first data string conversion unit 15 of the first communication device 10 converts the first authentication image into a data string by using a one-way function to generate the first authentication data (S208). Subsequently, the first transmission unit 13 transmits the generated first authentication data and the first identifier to the server device 30 (S210).

The second image input unit 22 of the second communication device 20 receives an input of the input image from the second portable terminal 50 (S212). Subsequently, the second image editing unit 23 edits the input image in accordance with a predetermined rule to generate the second authentication image (S214). Specifically, first, the second image clipping unit 23a clips a partial area of the input image (S214a). Subsequently, the second image processing unit 23b changes a pixel value of at least one of pixels included in the partial area clipped in accordance with a predetermined rule to generate the second authentication image (S214b).

Next, the second data string conversion unit 24 of the second communication device 20 converts the second authentication image into a data string by using a one-way function to generate the second authentication data (S216). Subsequently, the second transmission unit 21 transmits the generated second authentication data, the second identifier, and the registration image (second authentication image) to the server device 30 (S218).

The server receiving unit 31 of the server device 30 receives the first authentication data and the first identifier from the first communication device 10, and the second authentication data, the second identifier, and the registration image from the second communication device 20 (S220). Then, the matching check unit 35 checks whether or not the received first authentication data matches the registered authentication data stored in the authentication image storage unit 34 (S222). In the case where the first authentication data does not match the registered authentication data, the server transmission unit 36 transmits the registration image to the first communication device 10. In the case where the first authentication data matches the registered authentication data, for example, the server device 30 transmits a message representing that the first authentication data matches the registered authentication data to the first communication device 10, and finishes pairing processing using the first authentication data.

Next, the image check unit 16 of the first communication device 10 presents the registration image to the first user 60, and receives an input of the check result about the registration image from the first user 60 (S224). The first transmission unit 13 transmits the check result received from the first user 60 to the server device 30.

In the case where the check result shows confirmation, the comparison unit 32 of the server device 30 determines whether or not the first authentication data matches the second authentication data (S226). In the case where the check result shows denial, the server device 30 does not pair the first communication device 10 with the second communication device 20.

In the case where it is determined that the first authentication data matches the second authentication data, the pairing unit 33 pairs the first communication device 10 with the second communication device 20, using the first identifier and the second identifier (S228). Then, the server transmission unit 36 transmits the second identifier to the first communication device 10, and the first identifier to the second communication device 20 (S230).

In the case where it is determined that the first authentication data does not match the second authentication data, the server device 30 finishes its processing without pairing the first communication device 10 with the second communication device 20.

The first receiving unit 17 of the first communication device 10 receives the second identifier from the server device 30 (S232). Subsequently, the first address book registration unit 18 registers, in the address book, the second identifier and the registration image in association with each other (S234).

The second receiving unit 25 of the second communication device 20 receives the first identifier from the server device 30 (S236). Subsequently, the second address book registration unit 26 registers, in the address book, the first identifier and the second authentication image in association with each other (S238).

As in First embodiment, the communication control system in this embodiment uses the image edited by the first communication device 10 as the authentication image to pair the first communication device 10 with the second communication device 20. Since the edited image is used, the probability that the authentication data matches authentication images of other undesired communication devices can be lowered to prevent the concerned communication device from being paired with the undesired communication devices by mistake. Further, even when authentication data representing the authentication image is leaked to any undesired person, the probability that the person recognize the authentication data as data for pairing is low. That is, the communication control system in this embodiment can improve the security in pairing the first communication device 10 with the second communication device 20.

Further, the communication control system in this embodiment converts the first authentication image into the data string by using the one-way function to generate the first authentication data. Accordingly, in the server device, it is difficult to reconstitute the first authentication image from the first authentication data, enabling protection of the user's privacy.

Further, in the communication control system in accordance with this embodiment, like the first communication device 10, the second communication device 20 can also generate the authentication data from the input image. Accordingly, even when the input image rather than the authentication data is inputted to the second communication device 20, pairing can be performed. That is, even when data is leaked during transfer between the first user 60 and the second user 70, pairing cannot be performed by using the data as it is, which improves the security.

Further, in the communication control system in accordance with this embodiment, the second communication device 20 can register the second authentication image used for pairing with the first communication device 10 in the address book. Accordingly, if the second authentication image can remind the second user 70 of the first user 60, the second user 70 can omit inputting of a name of the first user 60 or the like to the address book. That is, the communication control system in accordance with this embodiment can improve the convenience of the second user 70.

Further, in the communication control system in accordance with this embodiment, the first communication device 10 can resister the registration image in the address book. Accordingly, if the registration image can remind the first user 60 of the second user 70, the first user 60 can omit inputting of a name of the second user 70 or the like to the address book. That is, the communication control system in accordance with this embodiment can improve the convenience of the first user 60.

Further, the communication control system in accordance with this embodiment enables the first user 60 to check whether or not a pairing partner is the second user 70 by using the registration image. Accordingly, it is possible to prevent the first communication device from being pairing with the communication device of users other than the correct pairing partner.

Further, the communication control system in accordance with this embodiment checks whether or not the first authentication data matches the registered authentication data. This can prevent the first communication device 10 from being wrongly paired with the other user's communication device, which improves the security.

Although the first image editing unit 12 includes the first image clipping unit 12a and the first image processing unit 12b in this embodiment, the first image editing unit 12 does not need to include both the units and may include either of them. In this case, like the first image editing unit 12, the second image editing unit 23 may include either the second image clipping unit 23a or the second image processing unit 23b.

In this embodiment, in the first image editing unit 12, the first image clipping unit 12a clips the partial area of the area of the input image and then, the first image processing unit 12b processes the clipped image. However, the input image does not need to be edited in this order. That is, after the first image processing unit 12b processes the input image, the first image clipping unit 12a may clip the partial area of the processed image. In this case, like the first image editing unit 12, the second image editing unit 23 may also edit the input image in the same manner.

Further, although the second image input unit 22 of the second communication device 20 receives the input image as an input in this embodiment, the second image input unit 22 may receive the first authentication data as the input. In this case, the second communication device 20 does not need to include the second image editing unit 23 and the second data string conversion unit 24.

Next, a specific example of the communication control system in accordance with First or Second embodiment will be described in following Third to Fifth embodiments.

Third Embodiment

Figure 6:
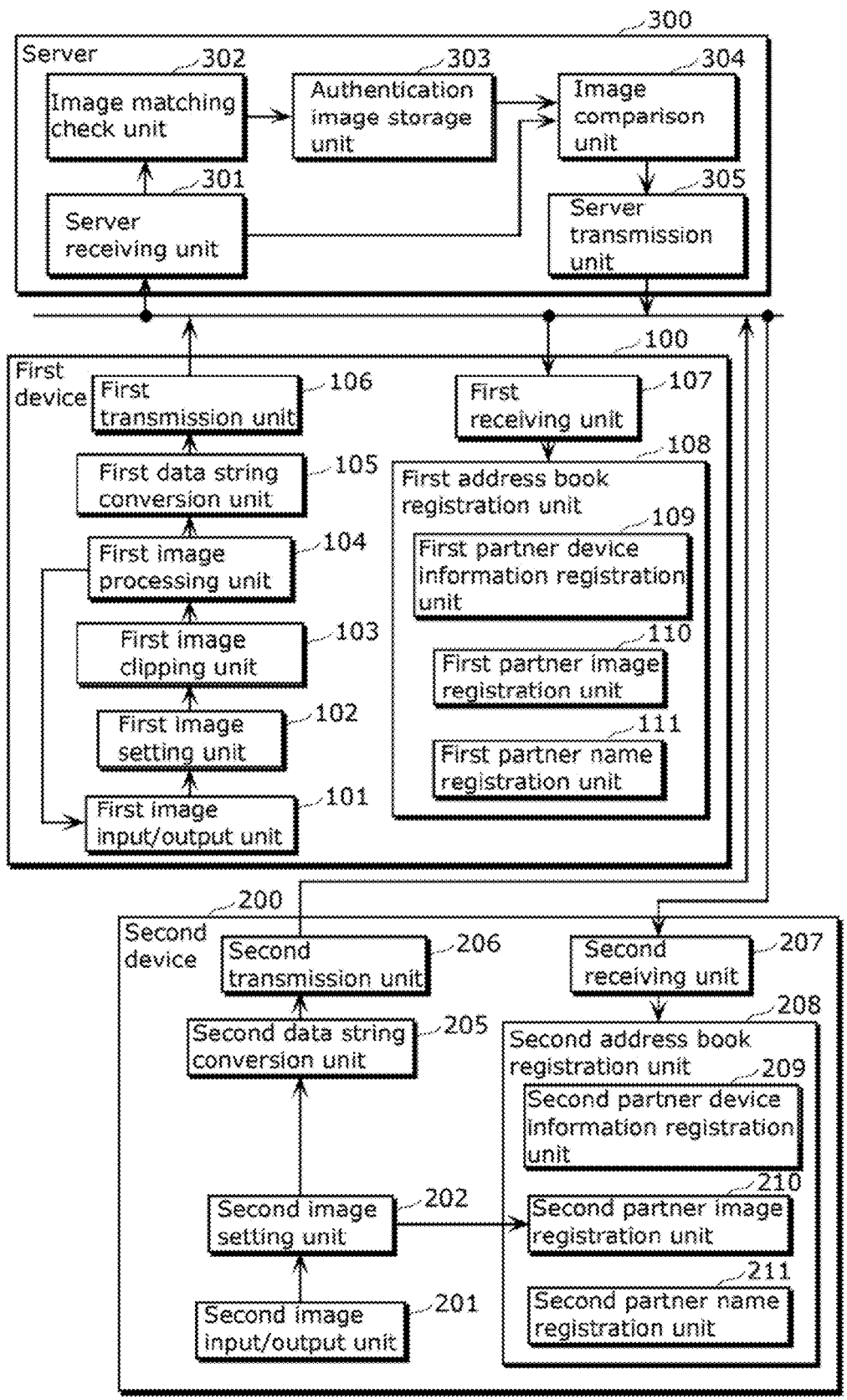
FIG. 6 is a block diagram showing a device pairing registration system in accordance with Third embodiment of the present invention.

FIG. 6 is a block diagram showing a device pairing system in accordance with First and Second embodiments of the present invention. The device pairing system corresponds to the communication control system in First or Second embodiment.

The device pairing system shown in FIG. 6 is a device pairing system that pairs a first device 100 with a second device 200 on a network via a server 300. The first device 100, the second device 200 and the server 300 correspond to the first communication device 10, the second communication device 20, and the server device 30 in First or Second embodiment, respectively.

The first device 100 has a first image input/output unit 101, a first image setting unit 102, a first image clipping unit 103, a first image processing unit 104, a first data string conversion unit 105, a first transmission unit 106, a first receiving unit 107, and a first address book registration unit 108. The first address book registration unit 108 has a first partner device information registration unit 109, a first partner image registration unit 110, and a first partner name registration unit 111.

The first image input/output unit 101 in this embodiment corresponds to combination of the first image input unit 11 and the first image output unit 14 in First or Second embodiment. Further, the first image clipping unit 103, the first image processing unit 104, the first data string conversion unit 105, the first transmission unit 106, the first receiving unit 107, and the first address book registration unit 108 correspond to the first image clipping unit 12a, the first image processing unit 12b, the first data string conversion unit 15, the first transmission unit 13, the first receiving unit 17, and the first address book registration unit 18, respectively.

The second device 200 has a second image input/output unit 201, a second image setting unit 202, a second data string conversion unit 205, a second transmission unit 206, a second receiving unit 207, and a second address book registration unit 208. The second address book registration unit 208 has a second partner device information registration unit 209, a second partner image registration unit 210, and a second partner name registration unit 211.

The second image input/output unit 201, the second data string conversion unit 205, the second transmission unit 206, the second receiving unit 207, and the second address book registration unit 208 in this embodiment correspond to the second image input unit 22, the second data string conversion unit 24, the second transmission unit 21, the second receiving unit 25, and the second address book registration unit 26 in First or Second embodiment, respectively.

The server 300 has a server receiving unit 301, an image matching check unit 302, an authentication image storage unit 303, an image comparison unit 304, and a server transmission unit 305.

The server receiving unit 301, the image matching check unit 302, the authentication image storage unit 303, the image comparison unit 304, and the server transmission unit 305 in this embodiment correspond to the server receiving unit 31, the matching check unit 35, the authentication image storage unit 34, the comparison unit 32, and the server transmission unit 36 in First or Second embodiment, respectively.

There will be described a case where the first user intends to share content data such as photographs with the second user via the network, and the first device 100 of the first user is paired with the second device 200 of the second user. However, the present invention is not limited to this case.

First, the first user inputs an image in the first device 100 by using the first image input/output unit 101. The first user sets an input image for authenticating pairing with the second device 200 by using the first image setting unit 102. The input image thus set may be an image selected from a plurality of images inputted to the first device 100, or a new image inputted from the first image input/output unit 101.

There is a possibility that the authentication input image set by the first image setting unit 102 is unnecessarily large in size, or that persons other than the second user who is to share data have the same image and thus, the first device is paired with an unexpected device. For this reason, the first image clipping unit 103 may clip, for example, a part of the input image. The first image processing unit 104 may process the authentication input image set by the user, and output the processed data as the authentication image.

When the authentication input image set by the first image setting unit 102 is not large in size, the first image clipping unit 103 does not need to clip the image. Further, in the case where the authentication input image set by the first image setting unit 102 does not match other user's images, the first image processing unit 104 does not need to process the image.

Next, when the image that is set by the first image setting unit 102, clipped by the first image clipping unit 103, and processed by the first image processing unit 104 is registered as the authentication image in the server 300, to prevent the image from being viewed on the network or the server, it is desired that data transmitted to the server 300 is converted into a hash value and is further encoded. At this time, the first data string conversion unit 105 converts the authentication image into an encoded hash value. The first transmission unit 106 transmits the encoded hash value to the server 300 on the network. However, in the case of a high level of security of the network or the server, the first data string conversion unit 105 may be omitted.

The server 300 receives the encoded hash value from the first device 100, decodes the encoded hash value (not shown), and registers the decoded hash value in the authentication image storage unit 303. The image matching check unit 302 checks whether or not the decoded hash value matches any of hash values of authentication images already registered by other users. Only in the case where the decoded hash value does not match any of the hash values of authentication images already registered by other users, the server 300 registers the decoded hash value in the authentication image storage unit 303. Conversely, in the case where the decoded hash value matches any of the hash values of authentication images already registered by the other users, the server 300 causes the first user to register an image that does not match authentication images already registered by the other users, for example, by requesting the first user to change the authentication image.

After the pairing authentication image is registered in the server 300, the first user passes the registered authentication image to the second user, for example, by attachment to a mobile phone mail. The authentication image can be passed to the second user according to various ways including attachment to a PC mail and passing a copy in a memory device such as an SD card.

The second user inputs the authentication image acquired from the first user by using the second image input/output unit 201 of the second device 200, and set the authentication image by using the second image setting unit 202. As in the first device 100, the authentication image set by the second image setting unit 202 is converted into a hash value and further encoded in the second data string conversion unit 205 and then, is transmitted to the server 300 on the network through the second transmission unit 206.

The server 300 receives the encoded hash value from the second device 200, decodes the encoded hash value (not shown), compares the decoded value with the hash value of the authentication image registered in the authentication image storage unit 303, and transmits a comparison result to the first device 100 and the second device 200. In the case where the comparison result is OK, the server 300 transmits information for identifying the second device 200 (second identifier) (for example, a device ID of the second device 200) to the first device 100 and information for identifying the first device 100 (first identifier) to the second device 200, along with the comparison result. In the case where the comparison result is NG, the server 300 transmits the comparison result to only the second device 200.

In the case where the second receiving unit 207 receives the comparison result from the server 300, when the comparison result is OK, the second device 200 displays a screen for registering a partner device (the first device 100 of the first user) in the address book. The second device 200 allows the second user to select whether or not the authentication image set by the second image setting unit 202 is used for registration in the address book.

In the case where the second user selects to use the authentication image, the second partner device information registration unit 209 registers the information for identifying the first device 100 in the address book, and the second partner image registration unit 210 registers the authentication image in the address book. As long as an image that reminds the second user of the first user (for example, a photograph of the first user) is used as the authentication image, even if a name of the first user is not registered in the address book, the second user can identify the first user on the basis of the registered authentication image. Thus, in the case where the authentication image is registered in the address book by the second partner image registration unit 210, the second user can omit inputting of a partner name. However, even when the second partner image registration unit 210 registers the authentication image in the address book, to register the partner name, it may be configured that the second user can input the partner name.

In the case where the first receiving unit 107 receives the comparison result from the server 300, when the comparison result is OK, the first device 100 displays a screen for registering the partner device (the second device 200 of the second user) in the address book. The first device 100 prompts the first user to register a partner image or input the partner name, the first partner image registration unit 110 registers the partner image in the address book, and the first partner name registration unit 111 registers the partner name inputted by the first user in the address book.

Figure 7:
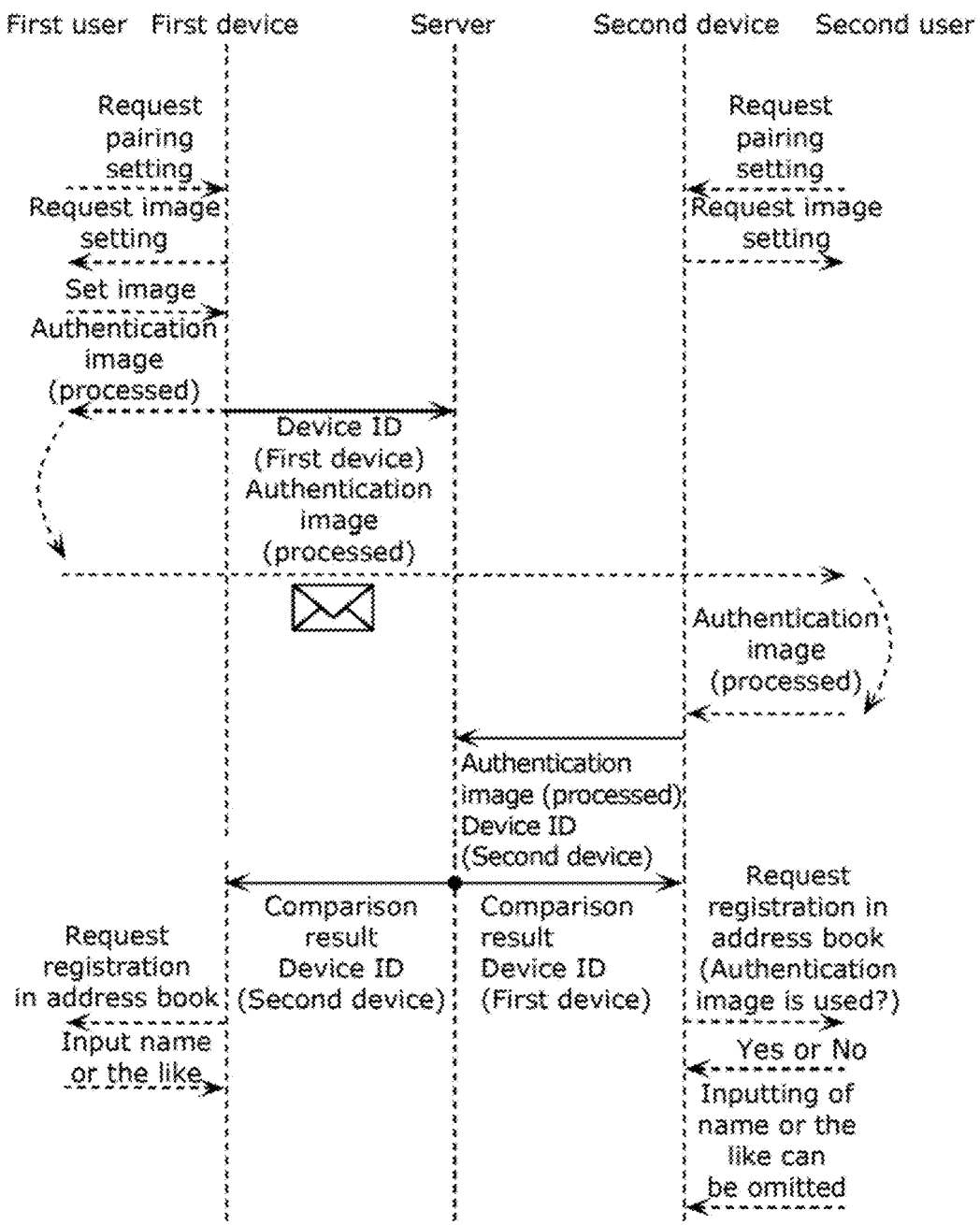
FIG. 7 is a flow chart of an example of device pairing processing in accordance with Third embodiment of the present invention.

FIG. 7 is a flow chart showing a device pairing processing in the device pairing system in accordance with Third embodiment of the present invention.

First, the first user causes the first device 100 to display a device pairing setting menu. In the device pairing setting menu, an input image for pairing authentication is set, for example, at the request of the device. The first device 100 clips the set input image or process a part of the input image to generate the authentication image. Then, the first device 100 transmits a hash value of the authentication image thus generated to the server 300. The first image input/output unit 101 outputs the authentication image.

The server 300 registers the hash value of the authentication image, which is received from the first device 100.

Next, the first user passes the pairing authentication image generated by the first device 100 (processed image) to the second user, for example, by attachment to a mail of a mobile phone.

The second user sets the pairing authentication image received from the first user at request of the device, for example, by using the device pairing setting menu of the second device 200. The second device 200 transmits a hash value of the set authentication image to the server 300.

The server 300 compares the hash value of the authentication image, which is received from the second device 200, with the registered hash value. When confirming that the hash value received from the first device 100 matches the hash value received from the second device 200, the server 300 transmits the comparison result and information identifying the partner device to each of the first device 100 and the second device 200.

In response to the comparison result, the first device 100 prompts the first user to input the partner name to be registered in the address book.

The second device 200 checks whether or not the second user uses the authentication image for registration in the address book. When the second user selects to use the authentication image for registration in the address book, the second device 200 can omit inputting of the partner name.

Fourth Embodiment

Next, Fourth embodiment of the present invention will be described. Description of the same matters as those in Third embodiment is omitted as necessary, and different matters will be mainly described below.

In this embodiment, the second user inputs the authentication image acquired from the first user by using the second image input/output unit 201 of the second device 200, and then, sets the authentication image by using the second image setting unit 202 as well as sets the authentication image as an image for registration in the address book of the partner device (registration image). As in Third embodiment, the authentication image set by the second image setting unit 202 is converted into a hash value and is further encoded by the second data string conversion unit 205, and is transmitted to the server 300 on the network through the second transmission unit 206. The registration image set by the second image setting unit 202 is transmitted to the server 300 without being converted into a hash value.

As in Third embodiment, the server 300 receives the encoded hash value from the second device 200, decodes the encoded hash value (not shown), compares the decoded hash value with the hash value of the authentication image registered in the authentication image storage unit 303, and transmits a comparison result to the first device 100 and the second device 200. In this embodiment, in the case of the comparison result of OK, the server 300 transmits information for identifying the second device 200 (for example, a device ID of the second device) and the registration image to the first device 100 and information for identifying the first device 100 to the second device 200, along with the comparison result. In the case of the comparison result of NG, the server 300 transmits the comparison result to only the second device 200.

In the case where the first receiving unit 107 receives the comparison result from the server 300, when the comparison result is OK, the first device 100 displays a screen for registering the partner device (the second device 200 of the second user) in the address book. The first device 100 allows the first user to select whether or not the registration image received from the server 300 is used for registration in the address book.

In the case where the first user selects to use the registration image, the first partner device information registration unit 109 registers information for identifying the second device 200 in the address book, and the first partner image registration unit 110 registers the registration image in the address book. As long as an image that reminds the first user of the second user (for example, a photograph of the second user) is used as the registration image, even when a name of the second user is not registered in the address book, the first user can identify the second user on the basis of the registered registration image. Thus, in the case where the registration image is registered in the address book by using the first partner image registration unit 110, the first user can omit inputting of the partner name. However, even when the registration image is registered in the address book by using the first partner image registration unit 110, to register the partner name, it may be configured that the first user can input the partner name.

Figure 8:
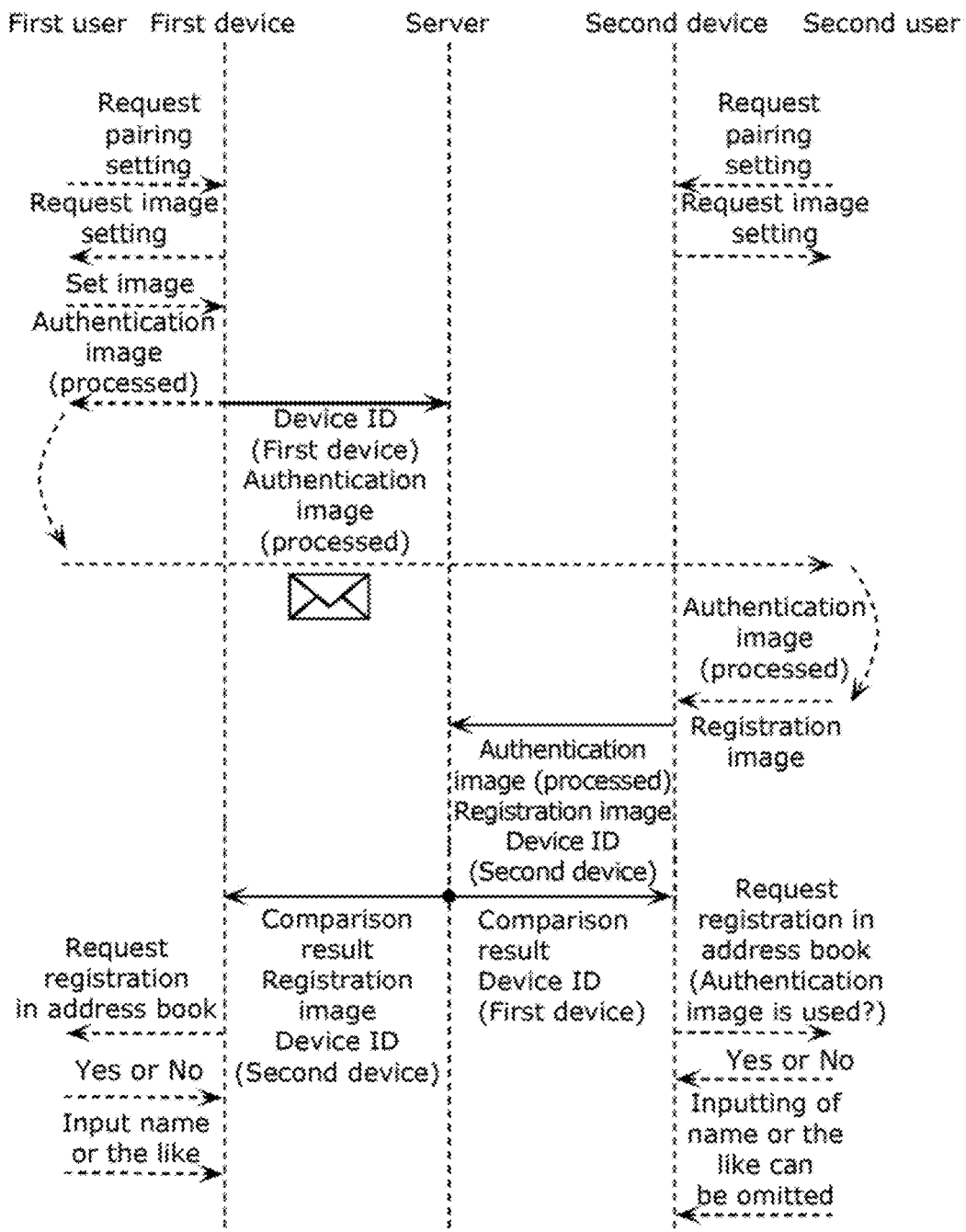
FIG. 8 is a flow chart of an example of device pairing processing in accordance with Fourth embodiment of the present invention.

FIG. 8 is a flow chart of device pairing processing in the device pairing system in accordance with Fourth embodiment of the present invention.

First, the first user causes the first device 100 to display a device pairing setting menu. In the device pairing setting menu, an input image for pairing authentication is set, for example, at the request of the device. The first device 100 clips the set input mage or processes a part of the input image to generate the authentication image. Then, the first device 100 transmits a hash value of the authentication image thus generated to the server 300. The first image input/output unit 101 outputs the authentication image.

The server 300 registers the hash value of the authentication image, which is received from the first device 100.

Next, the first user passes the pairing authentication image (processed image) generated by the first device 100 to the second user, for example, by attachment to a mobile phone mail.

The second user sets the pairing authentication image received from the first user at the request of the device, for example, by using the device pairing setting menu of the second device 200, and sets the authentication image as an image for registration in the address book of the partner device (registration image). The second device 200 transmits the hash value of the set authentication image and the registration image to the server 300.

The server 300 compares the hash value of the authentication image, which is received from the second device 200, with the registered hash value. In the case where it is confirmed that the hash value received from the first device 100 matches the hash value received from the second device 200, the server 300 transmits the comparison result and information identifying the partner device to each of the first device 100 and the second device 200. The server 300 transmits the registration image received from the second device 200 to the first device 100.

In response to the comparison result, the first device 100 asks the first user whether or not the registration image is used for registration in the address book. In the case where the first user selects to use the registration image, the first device 100 can omit inputting of the partner name or the like.

Like the first device 100, the second device 200 also asks the second user whether or not the registration image is used for registration in the address book. In the case where the second user selects to use the registration image, the second device 100 can omit inputting of the partner name or the like.

Fifth Embodiment

Next, Fifth embodiment of the present invention will be described. Description of the same matters as those in Third and Fourth embodiments is omitted as necessary, and different matters will be mainly described below.

Figure 9:
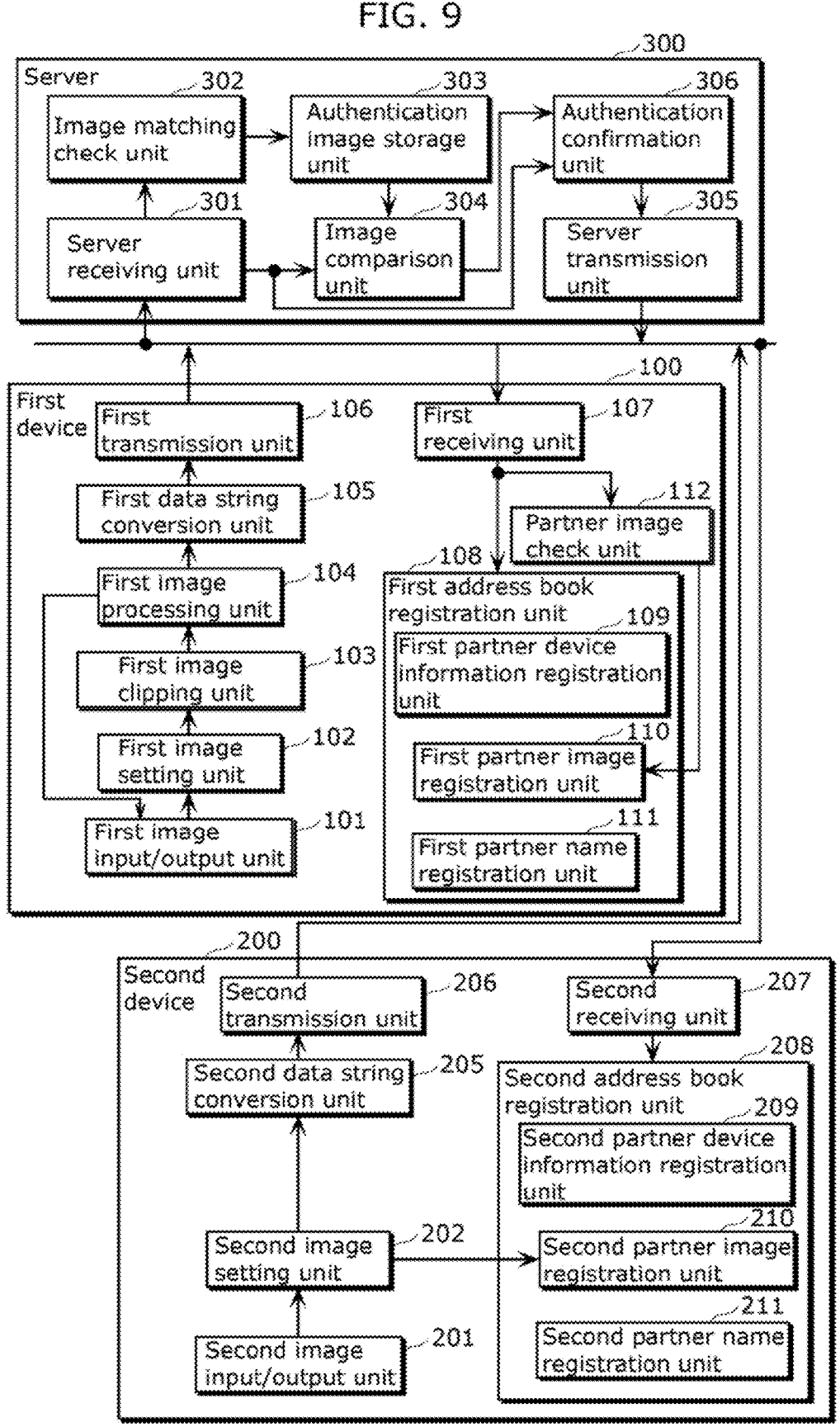
FIG. 9 is a block diagram showing a device pairing registration system in accordance with Fifth embodiment of the present invention.

FIG. 9 is a block diagram of a device pairing system in accordance with Fifth embodiment of the present invention. The device pairing system corresponds to the communication control system in First or Second embodiment.

The device pairing system in FIG. 9 is a device pairing system that pairs the first device 100 with the second device 200 on the network via the server 300. The first device 100, the second device 200, and the server 300 correspond to the first communication device 10, the second communication device 20, and the server device 30 in First or Second embodiment, respectively.

As shown in FIG. 9, the first device 100 has the first image input/output unit 101, the first image setting unit 102, the first image clipping unit 103, the first image processing unit 104, the first data string conversion unit 105, the first transmission unit 106, the first receiving unit 107, the first address book registration unit 108, and a partner image check unit 112. The first address book registration unit 108 has the first partner device information registration unit 109, the first partner image registration unit 110, and the first partner name registration unit 111.

The first image input/output unit 101 in this embodiment corresponds to combination of the first image input unit 11 and the first image output unit 14 in First or Second embodiment. Further, the first image clipping unit 103, the first image processing unit 104, the first data string conversion unit 105, the first transmission unit 106, the first receiving unit 107, the first address book registration unit 108, and the partner image check unit 112 correspond to the first image dipping unit 12a, the first image processing unit 12b, the first data string conversion unit 15, the first transmission unit 13, the first receiving unit 17, the first address book registration unit 18, and the image check unit 16, respectively.

The second device 200 has the second image input/output unit 201, the second image setting unit 202, the second data string conversion unit 205, the second transmission unit 206, the second receiving unit 207, and the second address book registration unit 208. The second address book registration unit 208 has the second partner device information registration unit 209, the second partner image registration unit 210, and the second partner name registration unit 211.

The second image input/output unit 201, the second data string conversion unit 205, the second transmission unit 206, the second receiving unit 207, and the second address book registration unit 208 in this embodiment correspond to the second image input unit 22, the second data string conversion unit 24, the second transmission unit 21, the second receiving unit 25, and the second address book registration unit 26, respectively.

The server 300 has the server receiving unit 301, the image matching check unit 302, the authentication image storage unit 303, the image comparison unit 304, an authentication confirmation unit 306, and the server transmission unit 305.

The server receiving unit 301, the image matching check unit 302, the authentication image storage unit 303, the image comparison unit 304, server transmission unit 305, and the authentication confirmation unit 306 in this embodiment correspond to the server receiving unit 31, the matching check unit 35, the authentication image storage unit 34, the comparison unit 32, the server transmission unit 36, and the pairing unit 33 in First or Second embodiment, respectively.

As in Fourth embodiment, the server 300 receives the encoded hash value from the second device 200, decodes the encoded hash value (not shown), and compares the decoded hash value with the hash value of the authentication image registered in the authentication image storage unit 303. In the case of the comparison result of OK, the server 300 in this embodiment transmits the registration image to the first device 100.

The partner image check unit 112 of the first device 100 presents the registration image transmitted from the server 300 to the first user, and prompts the first user to check whether or not the registration image is an image of the pairing partner (second user). The first user views the registration image presented by the first device 100 to check whether or not the registration image is the image of the second user. A check result about the partner image is transmitted from the first transmission unit 106 to the server receiving unit 301.

The authentication confirmation unit 306 of the server 300 confirms authentication in the case where both the comparison result and the partner image check result of the image comparison unit 304 are OK. That is, the authentication confirmation unit 306 pairs the first device 100 with the second device 200 in the case where the hash value of the authentication image from the first device 100 matches the hash value of the authentication image from the second device 200, and where it is confirmed that the registration image is the image of the pairing partner. The server transmission unit 305 transmits the authentication confirmation result to the first device 100 and the second device 200.

In the case of the authentication confirmation result of OK, the server transmission unit 305 transmits information for identifying the second device 200 (second identifier) and the registration image to the first device 100 and information for identifying the first device 100 (first identifier) to the second device 200, along with the authentication confirmation result. On the contrary, in the case of the authentication confirmation result of NG (either the comparison result or the partner image check result is NG), the server transmission unit 305 transmits the authentication confirmation result to the first device 100 and the second device 200.

Figure 10:
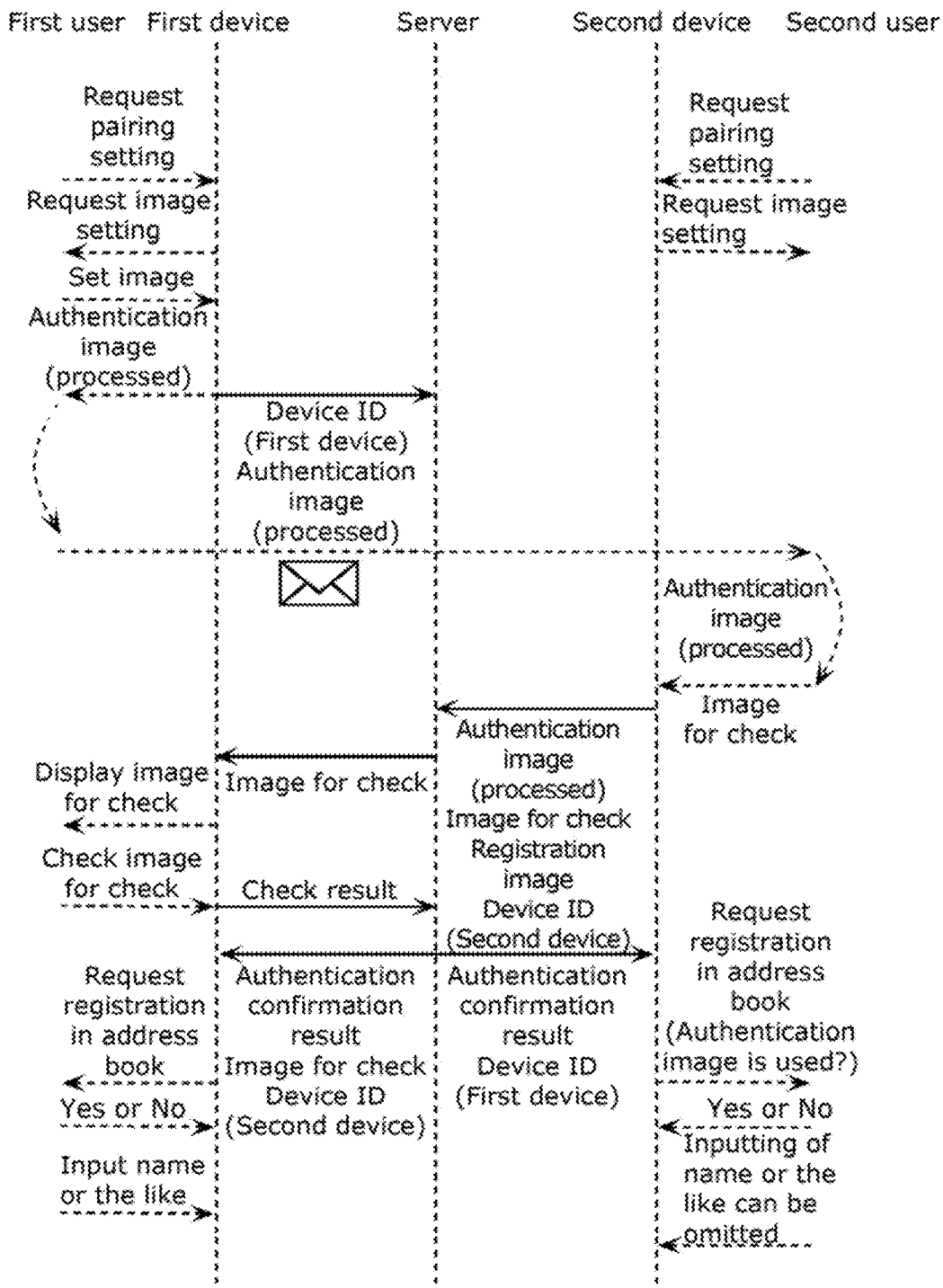
FIG. 10 is a flow chart of an example of device pairing processing in accordance with Fifth embodiment of the present invention.

FIG. 10 is a flow chart of device pairing processing in the device pairing system in accordance with Fifth embodiment of the present invention.

First, the first user causes the first device 100 to display a device pairing setting menu. In the device pairing setting menu, an input image for pairing authentication is set, for example, at the request of the device. The first device 100 clips the set input image or processes a part of the input image to generate the authentication image. Then, the first device 100 transmits a hash value of the authentication image thus generated to the server 300. The first image input/output unit 101 outputs the authentication image.

The server 300 registers the hash value of the authentication image, which is received from the first device 100.

Next, the first user passes the pairing authentication image generated by the first device 100 (processed image) to the second user, for example, by attachment to a mobile phone mail.

The second user sets the pairing authentication image received from the first user at the request of the device, for example, by using the device pairing setting menu of the second device 200, and sets the authentication image as an image for registration in the address book of the partner device (registration image). The second device 200 transmits a hash value of the set authentication image and the registration image to the server 300.

The server 300 compares the hash value of the authentication image, which is received from the second device 200, with the registered hash value. In the case where the hash value received from the first device 100 matches the hash value received from the second device 200, the server 300 transmits the registration image received from the second device 200 to the first device 100.

The first device 100 displays the received registration image, and receives an input of check whether or not the displayed image is the image of the second user from the first user. Then, the first transmission unit 106 transmits a check result about the registration image to the server 300.

In the case where the check result about the registration image is OK, the server 300 transmits an authentication confirmation result and information for identifying the partner device to each of the first device 100 and the second device 200, and transmits the registration image to the first device 100. Since the registration image has been already transmitted to the first device 100, the transmission at this time may be omitted.

In response to the authentication confirmation result, the first device 100 asks the first user whether or not the registration image is used for registration in the address book. In the case where the second user selects to use the registration image, the first device 100 can omit inputting of the partner name or the like.

The second device 200 also asks the second user whether or not the registration image is used for registration in the address book. In the case where the second user selects to use the registration image, the second device 200 can omit inputting of the partner name or the like.

Although the communication control system according to one aspect of the present invention has been described based on the embodiments, the present invention is not limited to these embodiments. Various modifications of these embodiments, which are conceived by those skilled in the art, or any combination of components of the different embodiments fall within the scope of one or more embodiments of the present invention as long as the modifications or combination do not deviate from the subject matter of the present invention.

For example, a part or all of the components of the first communication device 10 in First embodiment may be composed of one system LSI (Large Scale Integration). For example, the first communication device 10 may be composed of a system LSI including the first image input unit 11, the first image editing unit 12, and the first transmission unit 13.

The system LSI is a super-multifunctional LSI manufactured by integrating a plurality of units on one chip, specifically, a computer system including a microprocessor, a ROM (Read Only Memory), a RAM (Random Access Memory) and so on. A computer program is stored in the RAM. The microprocessor operates according to the computer program, thereby causing the system LSI to perform its functions.

Although the system LSI is mentioned herein, it may be referred to as IC, LSI, super LSI, or ultra LSI depending on degree of integration. Further, the integrated circuit is not limited to the LSI, and may be a dedicated circuit or general-purpose processor. An FPGA (Field Programmable Gate Array) capable of being programmable after manufacturing of the LSI or a reconfigurable processor capable of reconfiguring connection and setting of circuit cells in the LSI may be adopted.

As a matter of course, a possible integrated-circuit technology taking the place of the LSI, due to the progress of the semiconductor technology or the appearance of other derivative technologies, may be used to integrate functional blocks. The biotechnology could be applied.

Further, one aspect of the present invention may be the communication control system including such characteristic processing units, as well as a communication control method including the characteristic processing units in the communication control system as steps. Further, one aspect of the present invention may be a communication method including the characteristic processing units in the communication control system as steps. Further, one aspect of the present invention may be a computer program that causes a computer to execute each characteristic step in the communication method. Further, one aspect of the present invention may be a computer-readable nontemporary recording medium such as a CD-ROM (Compact Disc Read Only Memory), in which such computer program is stored.

In each of the above-mentioned embodiments, each component may be configured of a dedicated hardware, or may be realized by executing a software program suitable for each component. A program execution unit such as a CPU or a processor may read and execute a software program recorded in a recording medium such as a hard disc or a semiconductor memory to realize each component. The software for realizing the communication control system and the communication device in the above-mentioned embodiments is a following program.

That is, the program causes a computer to perform a communication method communication method performed by a communication device to be paired with another communication device, the method including receiving an input of an input image; editing the input image in accordance with a predetermined rule to generate a first authentication image; and transmitting first authentication data representing the first authentication image and a first identifier for identifying the first communication device to a server device that performs the pairing.

The communication control system according to the present invention is effective as a system that pairs two communication devices in sharing content data via the network.

REFERENCE SIGNS LIST 10 first communication device
11 first image input unit
12 first image editing unit
12a, 103 first image clipping unit
12b, 104 first image processing unit
13, 106 first transmission unit
14 first image output unit
15, 105 first data string conversion unit
16 image check unit
17, 107 first receiving unit
18, 108 first address book registration unit
20 second communication device
21, 206 second transmission unit
22 second image input unit
23 second image editing unit
23a second image clipping unit
23b second image processing unit
24, 205 second data string conversion unit
25, 207 second receiving unit
26, 208 second address book registration unit
30 server device
31, 301 server receiving unit
32 comparison unit
33 pairing unit
34, 303 authentication image storage unit 35 matching check unit
36, 305 server transmission unit
40 first portable terminal
50 second portable terminal
60 first user
70 second user
100 first device
101 first image input/output unit
102 first image setting unit
109 first partner device information registration unit
110 first partner image registration unit
111 first partner name registration unit
112 partner image check unit
200 second device
201 second image input/output unit
202 second image setting unit
209 second partner device information registration unit
210 second partner image registration unit
211 second partner name registration unit
300 server
302 image matching check unit
304 image comparison unit
306 authentication confirmation unit

The invention claimed is:

1. A communication control system comprising:
a first communication device;
a second communication device; and
a server device that pairs the first communication device with the second communication device to control communication between the first communication device and the second communication device,
wherein the first communication device includes:
a first image input unit configured to receive an input of an input image;
a first image editing unit configured to modify the input image in accordance with a predetermined rule to generate a first authentication image; and
a first transmission unit configured to transmit first authentication data representing the first authentication image and a first identifier for identifying the first communication device to the server device,
the second communication device includes:
a second image input unit configured to receive an input of the input image;
a second image editing unit configured to modify the input image in accordance with the predetermined rule used by the first communication device to generate a second authentication image; and
a second transmission unit configured to transmit second authentication data representing the second authentication image and a second identifier for identifying the second communication device to the server device, and
the server device includes:
a server receiving unit configured to receive the first authentication data and the first identifier from the first communication device, and receive the second authentication data and the second identifier from the second communication device;
a comparison unit configured to determine whether or not the first authentication data matches the second authentication data;
a pairing unit configured to pair the first communication device with the second communication device, using the first identifier and the second identifier, in the case where it is determined that the first authentication data matches the second authentication data.

2. The communication control system according to claim 1,
wherein the first image editing unit includes a first image clipping unit configured to clip a partial area of the input image in accordance with the predetermined rule to modify the input image.

3. The communication control system according to claim 2,
wherein the first image clipping unit is configured to extract an object from the input image and clip an area including the extracted object as the partial area in accordance with the predetermined rule.

4. The communication control system according to claim 1,
wherein the first image editing unit includes a first image processing unit configured to change a pixel value of at least one of pixels included in the input image in accordance with the predetermined rule to modify the input image.

5. The communication control system according to claim 1,
wherein the first communication device further includes a first data string conversion unit configured to convert the first authentication image into a data string by using a one-way function to generate the first authentication data.

6. The communication control system according to claim 5,
wherein the second communication device further includes a second data string conversion unit configured to convert the second authentication image into a data string by using the one-way function to generate the second authentication data.

7. The communication control system according to claim 1, further comprising:
a first portable terminal; and
a second portable terminal connected to the first portable terminal via a wide-area communication network,
wherein the first communication device further includes a first image output unit configured to output the input image to the first portable terminal,
the first portable terminal transmits, to the second portable terminal, the input image outputted from the first image output unit,
the second portable terminal receives the input image from the first portable terminal, and
the second image input unit is further configured to receive an input of the input image from the second portable terminal.

8. The communication control system according to claim 1,
wherein the server device further includes:
an authentication image storage unit configured to store registered authentication data that is authentication data used in previous pairing; and
a matching check unit configured to check whether or not the first authentication data matches the registered authentication data stored in the authentication image storage unit, and
the pairing unit is configured to pair the first communication device with the second communication device in the case where it is determined that the first authentication data matches the second authentication data and where the first authentication data does not match the registered authentication data.

9. The communication control system according to claim 1, wherein the first image input unit is further configured to receive an image taken by a portable terminal as the input image from the portable terminal.

10. The communication control system according to claim 1,
wherein the first image input unit is an interface for a portable recording medium.

11. The communication control system according to claim 1,
wherein the first image input unit is an interface for near field communication.

12. A communication control system comprising:
a first communication device;
a second communication device; and
a server device that pairs the first communication device with the second communication device to control communication between the first communication device and the second communication device,
wherein the first communication device includes:
a first image input unit configured to receive an input of an input image;
a first image editing unit configured to modify the input image in accordance with a predetermined rule to generate a first authentication image; and
a first transmission unit configured to transmit first authentication data representing the first authentication image and a first identifier for identifying the first communication device to the server device,
the second communication device includes:
a second transmission unit configured to transmit second authentication data representing a second authentication image and a second identifier for identifying the second communication device to the server device, and
the server device includes:
a server receiving unit configured to receive the first authentication data and the first identifier from the first communication device, and receive the second authentication data and the second identifier from the second communication device;
a comparison unit configured to determine whether or not the first authentication data matches the second authentication data;
a pairing unit configured to pair the first communication device with the second communication device, using the first identifier and the second identifier, in the case where it is determined that the first authentication data matches the second authentication data,
wherein the server device further includes a server transmission unit configured to transmit the second identifier to the first communication device, and transmit the first identifier to the second communication device, in the case where the first communication device is paired with the second communication device,
the first communication device further includes:
a first receiving unit configured to receive the second identifier from the server device; and
a first address book registration unit configured to register the received second identifier in an address book, and
the second communication device further includes:
a second receiving unit configured to receive the first identifier from the server device; and
a second address book registration unit configured to register, in the address book, the received first identifier and the second authentication image in association with each other, and wherein the second transmission unit is further configured to transmit the second authentication image as a registration image to the server device,
the server receiving unit is further configured to receive the registration image from the second communication device,
the server transmission unit is further configured to transmit the registration image to the first communication device,
the first receiving unit is further configured to receive the registration image from the server device, and
the first address book registration unit is configured to register, in the address book, the second identifier and the registration image in association with each other.

13. The communication control system according to claim 12,
wherein the first communication device further includes an image check unit configured to present the registration image to a user and receive an input of a check result about the registration image from the user,
the first transmission unit is further configured to transmit the check result received by the image check unit to the server device,
the server receiving unit is further configured to receive the check result from the first communication device, and
the pairing unit is configured to pair the first communication device with the second communication device according to the check result in the case where it is determined that the first authentication data matches the second authentication data.

14. A communication control method performed in a communication control system including a first communication device, a second communication device, and a server device that pairs the first communication device with the second communication device to control communication between the first communication device and the second communication device, the method comprising:
receiving an input of an input image by the first communication device;
modifying the input image by the first communication device in accordance with a predetermined rule to generate a first authentication image;
transmitting first authentication data representing the first authentication image and a first identifier for identifying the first communication device from the first communication device to the server device;
receiving an input of an input image by the second communication device;
modifying the input image by the second communication device in accordance with the predetermined rule used by the first communication device to generate a second authentication image;
transmitting second authentication data representing the second authentication image and a second identifier for identifying the second communication device from the second communication device to the server device;
receiving the first authentication data and the first identifier from the first communication device, and the second authentication data and the second identifier from the second communication device by the server device;
determining whether or not the first authentication data matches the second authentication data by the server device; and
pairing the first communication device with the second communication device by the server device, using the first identifier and the second identifier in the case where it is determined that the first authentication data matches the second authentication data.

15. A computer-readable non-transitory recording medium having a program recorded thereon for causing a computer to perform the communication control method according to claim 14.

* * * * *